(12) United States Patent
Hudson

(10) Patent No.: US 8,313,301 B2
(45) Date of Patent: Nov. 20, 2012

(54) COOLED TURBINE BLADE SHROUD

(75) Inventor: Eric A. Hudson, Harwinton, CT (US)

(73) Assignee: United Technologies Corporation, Hartford, CT (US)

( * ) Notice: Subject to any disclaimer, the term of this patent is extended or adjusted under 35 U.S.C. 154(b) by 752 days.

(21) Appl. No.: 12/362,724

(22) Filed: Jan. 30, 2009

(65) Prior Publication Data
US 2010/0196160 A1  Aug. 5, 2010

(51) Int. Cl.
*F04D 29/40* (2006.01)
(52) U.S. Cl. ........... 416/191; 416/90 R; 416/95; 416/96; 416/97 R
(58) Field of Classification Search ............ 416/191, 416/90 R, 95, 96, 97 R; 415/115, 116
See application file for complete search history.

(56) References Cited

U.S. PATENT DOCUMENTS
7,686,581 B2 *  3/2010  Brittingham et al. ....... 416/97 R
* cited by examiner

*Primary Examiner* — Robert Pascal
*Assistant Examiner* — Kimberly Glenn
(74) *Attorney, Agent, or Firm* — Bachman & LaPointe, P.C.

(57) ABSTRACT

A turbine blade for use in high temperature applications includes an as-cast airfoil portion and an as-cast outer tip shroud portion and the outer tip shroud portion has at least one as-cast internal cooling circuit for cooling the outer tip shroud, and the at least one as-cast internal cooling circuit having a plurality of exits for discharging cooling air over exterior surfaces of the shroud. A process for forming a turbine blade comprises the steps of forming an as-cast turbine blade having an airfoil portion and a tip shroud and the forming step comprising forming at least one as-cast cooling circuit within the tip shroud.

6 Claims, 4 Drawing Sheets

COOLED TURBINE BLADE SHROUD

BACKGROUND

There is described herein a turbine blade having a tip shroud with cooling circuits for use in high temperature applications.

Turbine blade tip shrouds can be used to provide a useful flowpath shape (conical flowpath outer diameter) and to minimize tip leakage flow to increase turbine efficiency. Tip shrouds can also provide structural benefits by changing blade natural frequencies and mode shapes, as well as providing frictional damping from the interaction between mating blade shroud segments. Tip shrouds can degrade in operation by creep (curling up of shroud edges) or oxidation if the shroud metal temperature and/or stress exceed the capability of the material from which the blade and the shroud are produced.

Historically, it has been difficult and expensive to provide cooling features to turbine blade tip shrouds. As a result, blades with tip shrouds often have been limited to lower temperature stages of a gas turbine engine. Limitations in manufacturing capability have greatly constrained shroud cooling features, with existing designs either providing lightweight, extensive cooling at great cost, simple cooling at reduced cost or thick, heavy designs which require very heavy blades and rotors to support the large cooled shrouds.

Use of traditional ceramic core materials to form internal cooling passages in blade shrouds results in air passages which are excessively thick compared to the rest of the shroud geometry, leading to an excessively thick and heavy blade tip and a very heavy blade/rotor stage. Failure can occur due to the high stress imparted by the heavy tip shroud.

Other methods used in the past are open cavities closed with coverplates, such as that shown in FIG. 1. The coverplates are welded over machined cooling passages. The coverplates tend to be heavy and the overall process of manufacture is expensive.

Another method used in the past is the fabrication of EDM cooling passages. Such a method is shown in FIG. 2. Forming cooling passages in this manner is expensive and has very limited, straight line passage geometry limitations.

These prior processes for forming shrouds with cooling are expensive, create life debits due to welding, and can form heavy shrouds due to parasitic mass of a coverplate. Still other processes are slow as well as expensive and provide limited cooling passage geometry capability.

FIGS. 3-5 show a large-size industrial engine airfoil concept that uses a large plenum core in the tip shroud fed by drilled holes in the blade. The dashed outline shown in FIG. 5 illustrates the plenum boundary. The airfoil is fabricated using covers and ceramic core inserts. This fabrication concept suffers from being expensive and heavy. Further, this concept used a plenum, rather than a defined duct with a confined path with inlets and exits. Plenums such as this suffer from uncertain local internal flow conditions with low heat transfer.

SUMMARY OF THE DISCLOSURE

In accordance with the present disclosure, there is provided a shroud having a plurality of cooling passages, which cooling passages are formed using refractory metal core technology. Cooling passages formed in this manner are advantageous because they provide controlled internal air velocity and effective cooling through the extent of the passage.

A turbine blade for use in high temperature applications is disclosed, which turbine blade broadly comprises an as-cast airfoil portion and an as-cast outer tip shroud portion, the outer tip shroud portion having at least one as-cast internal cooling passage for cooling the outer tip shroud, and the at least one as-cast internal cooling passage having one or more exits for discharging cooling air over exterior surfaces of the shroud.

A process for forming a turbine blade is disclosed which broadly comprises the steps of forming an as-cast turbine blade having an airfoil portion and a tip shroud, and the forming step comprising forming at least one as-cast cooling passage within the tip shroud.

Other details of the RMC cooled turbine blade shroud of the present disclosure, as well as objects and advantages attendant thereto, are set forth in the following detailed description and the accompanying drawings wherein like reference numerals depict like elements.

DETAILED DESCRIPTION OF THE PREFERRED EMBODIMENT(S)

As described herein, there is disclosed a turbine blade having a tip shroud with a plurality of thin cooling passages cast integrally into the tip shroud using refractory metal core technology. The passages may have a thickness in the range of from 0.010 to 0.060 inches. This type of thin, as cast, internal cooling passage in the tip shroud provides high heat transfer with a very small increase in shroud thickness, namely from 0.030-0.100 inches less thickness than required by conventional ceramic core casting techniques.

This type of manufacturing is useful because the shape of the refractory metal core(s) can be tailored as needed to the specific blade being designed without the need for expensive machining operations and/or welded coverplates. Heat transfer augmentation features, such as trip strips and pedestals, can be easily fabricated and used as needed to increase shroud cooling and passage flow.

Figure 1:
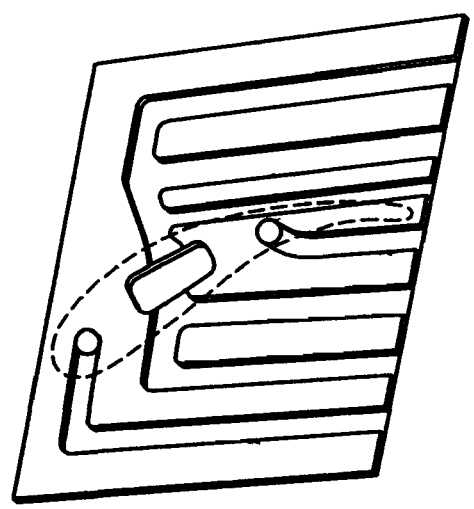
FIG. 1 illustrates an approach for providing a cooled tip shroud.
Figure 2:
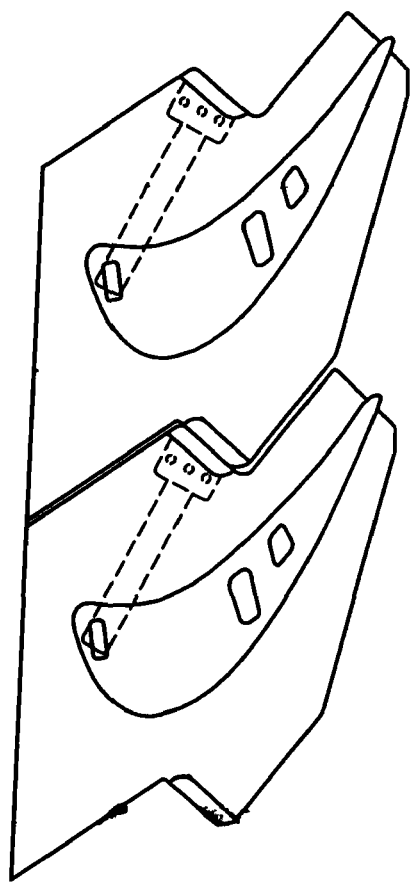
FIG. 2 illustrates another approach for providing a cooled tip shroud.
Figure 3:
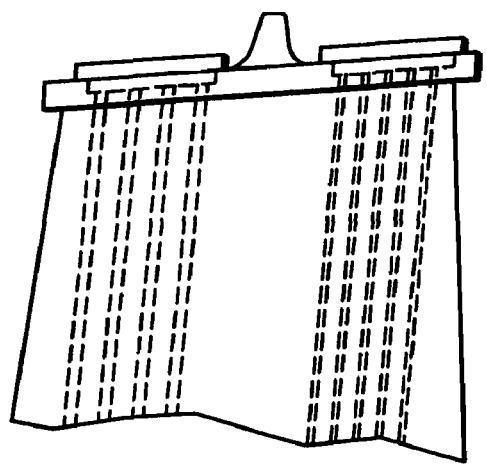
FIGS. 3-5 illustrate a plenum approach for providing a cooled tip shroud.
Figure 4:
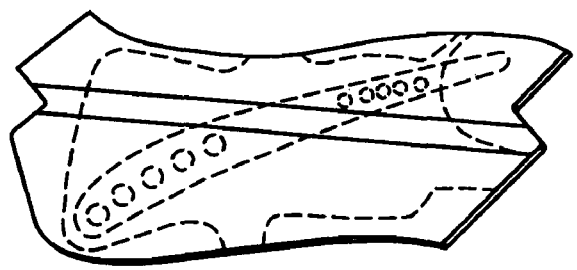
Figure 5:
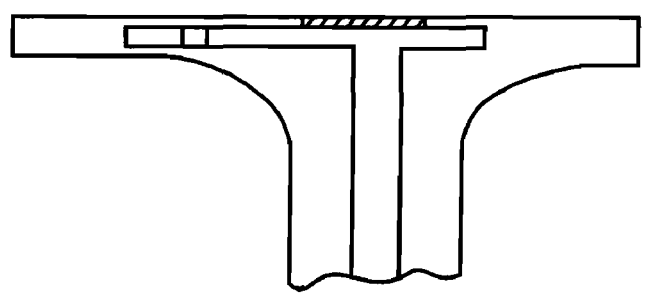
Figure 6:
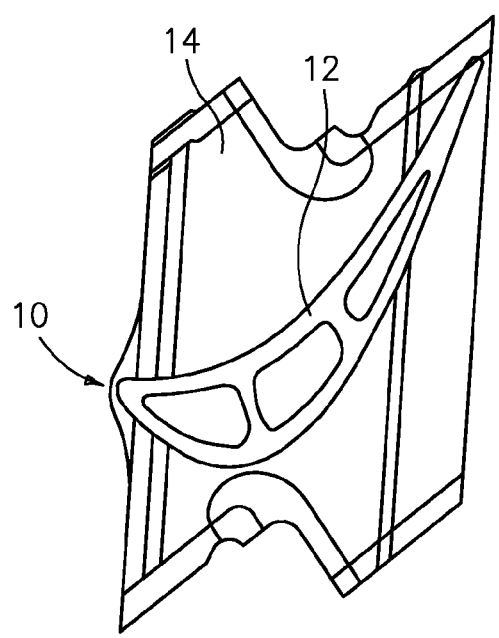
FIG. 6 shows a shroud with a cross section of an airfoil superimposed thereon.
Figure 7:
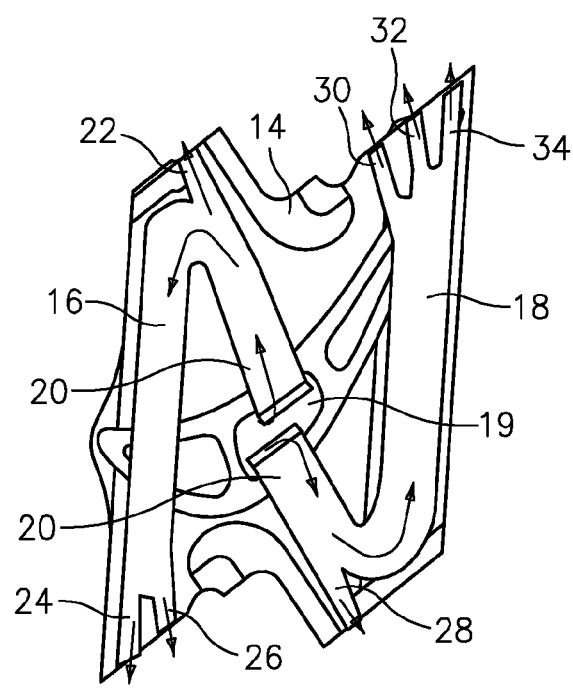
FIG. 7 is a sectional view of a shroud having internal cooling passages formed using refractory metal core technology.

Referring now to FIGS. 6 and 7, there is shown a turbine blade 10 having an airfoil portion 12 and an outer tip shroud 14. The tip shroud 14 may be provided with a first cooling passage 16 and a second cooling passage 18. Each of the cooling passages 16 and 18 is formed using refractory metal core technology. Each of the cooling passages has an inlet 20 which communicates with a source (not shown) of cooling fluid via a common central channel or fluid conduit 19 within the airfoil portion 12. Each cooling circuit 16 and 18 may be desirably located at a mid-plane level of the as-cast shroud. By "mid-plane", it is meant that there is an equal thickness of the shroud above and below each cooling circuit 16 and 18. Offset cooling passages may be advantageous to some specific designs.

Each of the cooling passages 16 and 18 may have a one or more exits for flowing cooling fluid over desired portions of the tip shroud 14, such as over exterior surfaces of the shroud, or directly out of the shroud. As can be seen from FIG. 7, the cooling passage 16 may have an exit 22 on one side of the tip shroud 14 and a plurality of exits 24 and 26 on an opposite side of the tip shroud 14. The cooling passage 18 may have an exit 28 on one side of the tip shroud 14 and three cooling exits 30, 32, and 34 on an opposite side of the tip shroud 14. The number of cooling exits and their locations in each cooling passage 16 or 18 may be tailored as needed to promote efficient cooling of the shroud. A tip shroud 14 having as-cast cooling passages 16 and 18 with the exits as shown in FIG. 7 provides efficient cooling at low cost and weight.

Figure 8:
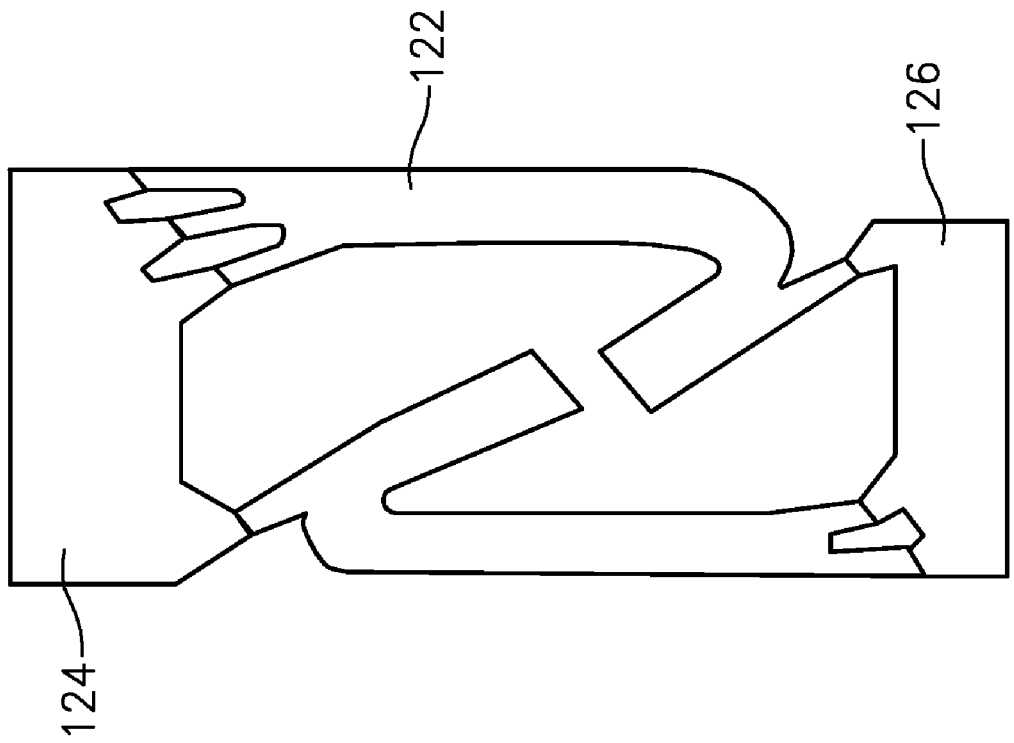
FIG. 8 illustrates a ceramic core with refractory metal cores attached thereto.

The turbine blade 10 with the airfoil portion 12 and the tip shroud 14 may be formed using any suitable casting technique in which a primary ceramic core 100 (such as that shown in FIG. 8) is used to form the primary blade radial inner passages with the primary ceramic core 100 being centrally positioned within a die having the shape of the outer portions of the turbine blade. As can be seen from FIG. 8, a plurality of refractory metal cores (RMCS) 102 and 104 are joined to the primary ceramic core 100. The refractory metal cores 102 and 104 may be formed from any suitable refractory material known in the art, such as molybdenum or a molybdenum alloy. Each of the refractory metal cores 102 and 104 may be joined to the primary ceramic core 100 by means of one or more tabs 108 bent over and inserted into slots 110 in the tip 112 of the primary ceramic core 100. The turbine blade 10 with the outer tip shroud 14 may be formed by casting any suitable superalloy material in a known manner. After the molten superalloy material has been poured into a mold (not shown) and cooled to solidify and form the turbine blade 10, the airfoil portion 12 and the tip shroud 14, the primary ceramic core 100 may be removed using any suitable leaching technique known in the art. Thereafter, the refractory metal cores 102 and 104 may be removed using any suitable leaching technique known in the art. Once the refractory metal cores 102 and 104 are removed, there is left an as-cast shroud having the as-cast, thin cooling passages 16 and 18.

If desired, the refractory metal cores 102 and 104 may each be provided with a plurality of slots or holes for forming a plurality of pedestals or a plurality of trip strips in each cooling circuit 16 and 18 for enhancing cooling effectiveness.

Figure 9:
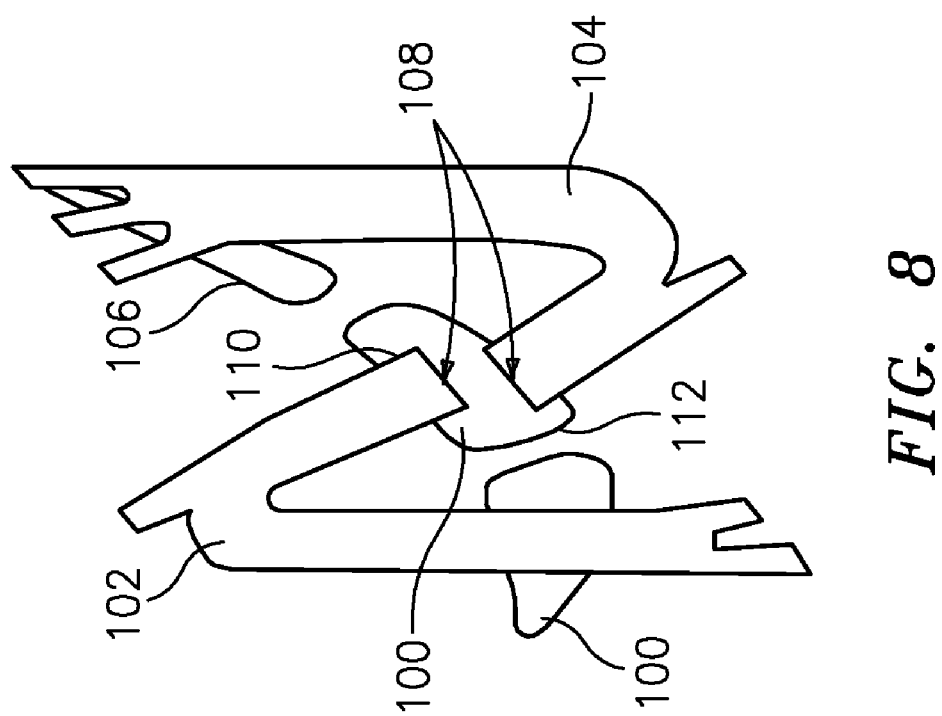
FIG. 9 illustrates a single refractory metal core used to form more than one passage.

If desired, as shown in FIG. 9, a single refractory metal core 122 may be used to form more than one passage in the finished part. The portions 124 and 126 are outside the envelope of the finished casting and are removed after the pot is formed. Also, it may be desirable to have one cooling passage, rather than multiple passages.

One advantage to the approach described herein is that the exits for the cooling circuits may be sized to provide a desirable level of cooling without the need to employ machining of the as-cast material. Thus, the technique described herein is a cost effective technique for introducing extensive cooling features in a turbine blade tip shroud, with minimal increase in shroud thickness. This allows turbine tip shrouds to be an effective option in engine environments where the gas temperature is substantially above the useful temperature capability of the airfoil alloy where they were previously not practical and/or cost effective. This is of potential value for low pressure turbine blades that can benefit from a conical OD flowpath and reduced tip leakage provided by shrouded stages.

It is apparent that there has been provided in accordance with the instant disclosure a RMC cooled turbine blade shroud. While the RMC cooled turbine blade shroud has been described in the context of specific embodiments thereof, other unforeseen variations, alternatives, and modifications may become apparent to those skilled in the art having read the foregoing description. Accordingly, it is intended to embrace those alternatives, variations, and modifications as fall within the broad scope of the appended claims.

What is claimed is:

1. A turbine blade for use in high temperature applications, said turbine blade comprising:
    an as-cast airfoil portion and an as-cast outer tip shroud portion;
    said outer tip shroud portion having at least two as-cast internal cooling passages for cooling said outer tip shroud portion; and
    said at least two as-cast internal cooling passages each having at least one exit for discharging cooling air over exterior surfaces of said shroud portion or directly out of the shroud portion; and
    each said cooling passage being located at a mid-plane level of the shroud portion.

2. The turbine blade of claim 1, wherein each of said cooling passages has an inlet and each said inlet receives cooling fluid from a common channel within said airfoil portion.

3. The turbine blade of claim 1, wherein said at least two cooling passages includes a first cooling passage and a second cooling passage, wherein said at least one exit of said first cooling passage includes one cooling fluid exit on a first side of said shroud portion and at least two additional cooling fluid exits on a second side of said shroud portion opposed to said first side and wherein said at least one exit of said second cooling passage includes one cooling fluid exit on said second side and at least two additional cooling fluid exits on said first side.

4. A turbine blade for use in high temperature applications, said turbine blade comprising:
    an as-cast airfoil portion and an as-cast outer tip shroud portion;
    said outer tip shroud portion having at least two as-cast internal cooling passages for cooling said outer tip shroud;
    said at least two as-cast internal cooling passages including a first cooling passage and a second cooling passage;
    said first cooling passage having one cooling fluid exit on a first side of said shroud portion and at least two additional cooling fluid exits on a second side of said shroud portion opposed to said first side; and
    said second cooling passage having one cooling fluid on said second side and at least two additional cooling fluid exits on said first side.

5. The turbine blade of claim 4, wherein each said cooling passage is located at a mid-plane level of the shroud portion.

6. The turbine blade of claim 4, wherein each of said cooling passages has an inlet and each said inlet receives cooling fluid from a common channel within said airfoil portion.

* * * * *